UNITED STATES PATENT OFFICE.

LAMBERT THORP, OF DETROIT, MICHIGAN.

ETHYL-ISOPROPYL-BARBITURIC ACID.

1,255,951.

Specification of Letters Patent.

Patented Feb. 12, 1918.

No Drawing.

Application filed January 20, 1917. Serial No. 143,503.

*To all whom it may concern:*

Be it known that I, LAMBERT THORP, a citizen of the United States of America, residing at Detroit, in the county of Wayne and State of Michigan, have invented certain new and useful Improvements in Ethyl-Isopropyl-Barbituric Acid, of which the following is a specification.

My invention relates to the production of a hitherto unknown hypnotic substance, and has for its object the obtaining of a body which, while possessing marked hypnotic and sedative powers, is relatively devoid of toxic action.

I have found that ethylisopropylbarbituric acid or ethylisopropylmalonylurea possesses marked hypnotic and sedative powers and is relatively devoid of toxic action. These properties render this substance valuable for medicinal purposes. The average dose is from 0.3 to 0.5 gram. The usual size of the therapeutic dose is 0.25 gram or approximately four grains.

The new substance may be represented by the formula:

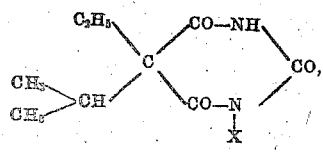

wherein X may be either a hydrogen atom or the atom of a metal, such, for instance as sodium.

The new body may be produced by various processes, one being the treating of urea with ethylisopropylmalonyl chlorid, as follows:

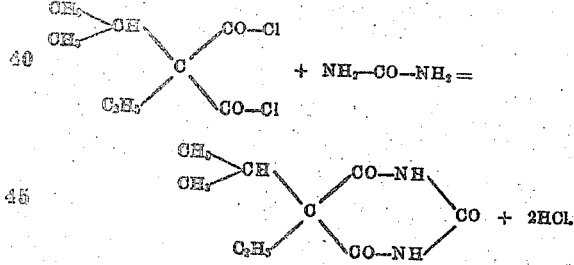

As a specific example, two parts by weight of the ethylisopropylmalonyl chlorid (obtainable by the action of phosphorus pentachlorid upon ethylisopropylmalonic acid) are mixed with one part by weight of urea, and the mixture is then heated in a suitable bath to a temperature of 100–120° C. for several hours. The end-point of the reaction is recognized from the fact that fumes of hydrogen chlorid cease to be evolved from the mixture. After cooling, the mass of the reaction is dissolved in boiling water, the solution decolorized by the aid of bone-black and then filtered. The ethylisopropylbarbituric acid separates as the filtrate cools.

The new substance crystallizes from water in the form of delicate, snow-white needles, melting at 197–198° C. It is only very slightly soluble in cold water; more readily soluble in hot water; easily soluble in alcohol or ether. Being an acid the substance forms salts, those of the alkalis being readily soluble in water. The general formula of these salts may be represented as follows:

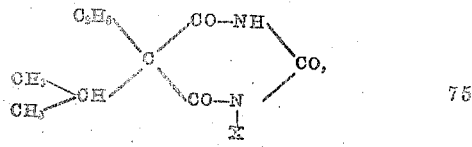

in which X stands for an atom of any metal.

The new substance is possessed of a mildly bitter taste.

In the claims, for want of a generic term, I shall use the term "ethylisopropylmalonylurea" as designating both the acid body and the salts thereof.

What I claim as my invention is:

1. The new hypnotic body, ethylisopropylmalonylurea, which may be represented by the formula:

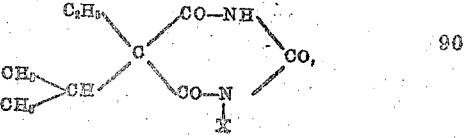

wherein X may be either a hydrogen atom or the atom of a metal such, for instance, as sodium.

2. The new hypnotic body, ethylisopropylmalonylurea, which may be represented by the formula:

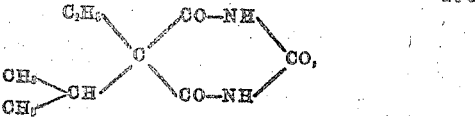

being an acid, crystallizing from water in the form of snow-white needles, melting at 197–198° C., being only slightly soluble in cold water, more readily soluble in hot water, easily soluble in alcohol or ether; forming salts with the alkali metals which are readily soluble in water; being possessed of a mildly bitter taste, and displaying a hypnotic and sedative action, substantially as described.

In testimony whereof I affix my signature.

LAMBERT THORP.